United States Patent
Saito et al.

(10) Patent No.: US 10,975,209 B2
(45) Date of Patent: Apr. 13, 2021

(54) METHODS FOR PRODUCING FLUORINATED POLYMER, FLUORINATED POLYMER HAVING FUNCTIONAL GROUP AND ELECTROLYTE MEMBRANE

(71) Applicant: AGC Inc., Chiyoda-ku (JP)

(72) Inventors: Susumu Saito, Chiyoda-ku (JP); Atsushi Watakabe, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/716,968

(22) Filed: Dec. 17, 2019

(65) Prior Publication Data

US 2020/0123337 A1 Apr. 23, 2020

Related U.S. Application Data

(63) Continuation of application No. PCT/JP2018/023664, filed on Jun. 21, 2018.

(30) Foreign Application Priority Data

Jun. 21, 2017 (JP) ................................. 2017-121534
Oct. 17, 2017 (JP) .............................. JP2017-201067

(51) Int. Cl.

| | | |
|---|---|---|
| C08J 5/22 | (2006.01) | |
| B01J 39/04 | (2017.01) | |
| B01J 47/00 | (2017.01) | |
| C08F 216/14 | (2006.01) | |
| C08F 214/24 | (2006.01) | |
| B01J 39/20 | (2006.01) | |
| B01J 39/05 | (2017.01) | |
| B01J 47/012 | (2017.01) | |
| B01J 39/07 | (2017.01) | |
| C25B 1/46 | (2006.01) | |
| C25B 13/08 | (2006.01) | |
| H01M 8/1023 | (2016.01) | |
| H01M 8/1039 | (2016.01) | |
| H01M 8/1018 | (2016.01) | |

(52) U.S. Cl.
CPC ............. *C08J 5/2293* (2013.01); *B01J 39/05* (2017.01); *B01J 39/07* (2017.01); *B01J 39/20* (2013.01); *B01J 47/012* (2017.01); *C08F 216/1475* (2020.02); *C08J 5/225* (2013.01); *C08J 2329/10* (2013.01); *C25B 1/46* (2013.01); *C25B 13/08* (2013.01); *H01M 8/1023* (2013.01); *H01M 8/1039* (2013.01); *H01M 2008/1095* (2013.01)

(58) Field of Classification Search
USPC ......................................................... 526/206
See application file for complete search history.

(56) References Cited

U.S. PATENT DOCUMENTS

| | | | |
|---|---|---|---|
| 5,182,342 A | 1/1993 | Feiring et al. | |
| 8,377,998 B2 * | 2/2013 | Tomita | ................ C08F 214/182 521/27 |
| 2009/0042067 A1 * | 2/2009 | Honmura | ............ H01M 8/1023 429/481 |

FOREIGN PATENT DOCUMENTS

| | | |
|---|---|---|
| JP | 07-504224 A | 5/1995 |
| JP | 3356474 B2 | 12/2002 |
| JP | 2010-018674 A | 1/2010 |
| JP | 2014-135144 A | 7/2014 |

OTHER PUBLICATIONS 1,1,2,2,3,3,4-heptafluororcyclopentane/CAS#:15290-77-4/Chennsrc, 3 pages, retrieved from https://www.chemsrc.com/en/cas/15290-77-4_312443.html (undated).*
Zhang, et al, "Synthesis of 1,1,2,2,3,3,4-heptafluorocyclopentane as a new generation of green solvent," Journal of Fluorine Chemistry 181 (2016) 11-16. (Year: 2016).*
International Search Report dated Aug. 14, 2018 in PCT/JP2018/023664 filed on Jun. 21, 2018.

* cited by examiner

*Primary Examiner* — Fred M Teskin
(74) *Attorney, Agent, or Firm* — Oblon, McClelland, Maier & Neustadt, L.L.P.

(57) ABSTRACT

To provide a method for producing a fluorinated polymer which enables stable production of a fluorinated polymer having a high molecular weight at a high polymerization rate with good productivity and reduced environmental burdens, a method for producing a fluorinated polymer having functional groups, and a method for producing an electrolyte membrane. A method for producing a fluorinated polymer, which comprises polymerizing a monomer mixture containing tetrafluoroethylene and a fluorinated monomer having a group convertible to a sulfonic acid group or a carboxylic acid group in a polymerization medium, wherein the polymerization medium contains as the main component a $C_{4-10}$ cyclic hydrofluorocarbon. Further, a method for producing a fluorinated polymer having functional groups and a method for producing an electrolyte membrane, employing the production method.

14 Claims, No Drawings

METHODS FOR PRODUCING FLUORINATED POLYMER, FLUORINATED POLYMER HAVING FUNCTIONAL GROUP AND ELECTROLYTE MEMBRANE

TECHNICAL FIELD

The present invention relates to methods for producing a fluorinated polymer, a fluorinated polymer having functional groups and an electrolyte membrane.

BACKGROUND ART

Fluorinated polymers having functional groups make membranes useful as ion exchange membranes. For example, membranes of a fluorinated polymer having carboxylic acid type functional groups or a fluorinated polymer having sulfonic acid type functional groups are used in alkali chloride electrolysis for production of an alkali hydroxide and chlorine from an aqueous alkali chloride such as seawater. Membranes of a fluorinated polymer having sulfonic acid type functional groups are known as ion exchange membranes used in fuel cells as electrolyte membranes.

As the fluorinated polymers, fluorinated polymers obtained by copolymerizing a fluorinated monomer having a carboxylic acid type functional group or a sulfonic acid type functional group such as perfluorovinyl ether and a fluorinated olefin such as tetrafluoroethylene are known (Patent Document 1). For production of such fluorinated polymers, polymerization of a fluorinated monomer having a group convertible to a sulfonic acid group and tetrafluoroethylene in a $C_{4-10}$ linear hydrofluorocarbon as a polymerization medium has been proposed.

PRIOR ART DOCUMENTS

Patent Documents

Patent Document 1: Japanese Patent No. 3356474

DISCLOSURE OF INVENTION

Technical Problem

Heretofore, fluorinated polymers having a high molecular weight are sometimes difficult to produce by polymerization of a fluorinated monomer having a group convertible to a carboxylic acid group or a sulfonic acid group and tetrafluoroethylene by the process disclosed in Patent Document 1. In view of productivity of a fluorinated polymer, a high polymerization rate is also important. Besides, it is also important to use a polymerization medium having a lower global warming potential (GWP) than linear hydrofluorocarbons such as $CF_3(CF_2)_5CHF_2$ having a GWP of 2,000, to reduce the environmental burden.

The object of the present invention is to provide a method for producing a fluorinated polymer which enables stable production of a fluorinated polymer having a high molecular weight at a high polymerization rate with good productivity and reduced environmental burdens, a method for producing a fluorinated polymer having functional groups, and a method for producing an electrolyte membrane, employing the production method.

Solution to Problem

Hydrofluorocarbons with low GWPs easily decompose in the atmosphere. Therefore, hydrofluorocarbons with low GWPs are vulnerable to OH radicals and, when used as a polymerization medium in radical polymerization, promote chain transfer reactions during the polymerization and hardly achieve sufficient molecular weights. However, according to studies by the present inventors, it was found that the chain transfer reaction is sufficiently suppressed in polymerization of a fluorinated monomer having a group convertible to a carboxylic acid group or a sulfonic acid group and tetrafluoroethylene, and a high molecular weight fluorinated polymer can be stably obtained, by using as a polymerization medium a $C_{4-10}$ cyclic hydrofluorocarbon even with a low GWP. They have further found that the polymerization rate is high as compared with a case where a chain hydrofluorocarbon is used, and accomplished the present invention.

The present invention provides the following.

[1] A method for producing a fluorinated polymer, which comprises polymerizing a monomer mixture containing tetrafluoroethylene and a fluorinated monomer having a group convertible to a sulfonic acid group or a carboxylic acid group in a polymerization medium, wherein the polymerization medium contains as the main component a $C_{4-10}$ cyclic hydrofluorocarbon.

[2] The production method according to the above [1], wherein the fluorinated monomer is a vinyl ether having a group convertible to a sulfonic acid group or a carboxylic acid group.

[3] The production method according to the above [1] or [2], wherein the proportion of tetrafluoroethylene is from 5 to 70 mol %, and the proportion of the fluorinated monomer is from 30 to 95 mol % to the total amount of the monomer mixture.

[4] The production method according to any one of the above [1] to [3], wherein the fluorinated polymer has a TQ value of from 150 to 340° C.

[5] The production method according to any one of the above [1] to [4], wherein the fluorinated monomer contains at least one member selected from the group consisting of a monomer represented by the following formula (m1) and a monomer represented by the following formula (m2):

(m1)

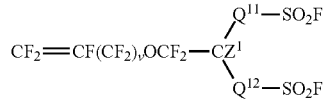
(m2)

wherein $X^1$ and $X^2$ are each independently a fluorine atom or a trifluoromethyl group, $A^1$ is a group convertible to a sulfonic acid group or a carboxylic acid group, p is 0 or 1, q is 0 or 1, r is an integer of from 0 to 3, s is 0 or 1, t is an integer of from 0 to 12, u is an integer of from 0 to 3, and $1 \leq r+u$, and $Q^{11}$ is a perfluoroalkylene group which may have an etheric oxygen atom, $Q^{12}$ is a single bond or a perfluoroalkylene group which may have an etheric oxygen atom, $Z^1$ is a fluorine atom or a monovalent perfluoroorganic group, and v is 0 or 1.

[6] The production method according to any one of the above [1] to [5], wherein the fluorinated monomer is $CF_2\!=\!CFOCF_2CF(CF_3)OCF_2CF_2SO_2F$, $CF_2\!=\!CFOCF_2CF_2SO_2F$, $CF_2\!=\!CFOCF_2CF_2CF_2CF_2SO_2F$ or $CF_2\!=\!CFCF_2OCF_2CF_2CF_2SO_2F$.

[7] The method for producing a fluorinated polymer according to any one of the above [1] to [5], wherein the fluorinated monomer is the following monomer (m2-1), (m2-2) or (m2-3):

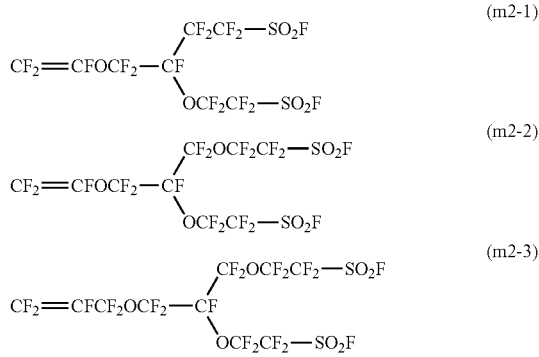

[8] The production method according to any one of the above [1] to [7], wherein the cyclic hydrofluorocarbon has fluorine atoms in the same number or more as hydrogen atoms.

[9] The production method according to any one of the above [1] to [8], wherein the cyclic hydrofluorocarbon is 1,1,2,2,3,3,4-heptafluorocyclopentane or 1H,2H-octafluorocyclopentane.

[10] The production method according to any one of the above [1] to [9], wherein the content of the cyclic hydrofluorocarbon is at least 50 mass % in the entire polymerization medium.

[11] A method for producing a fluorinated polymer having functional groups, which comprises producing a fluorinated polymer by the production method as defined in any one of the above [1] to [10], and converting groups convertible to sulfonic acid groups in the fluorinated polymer to sulfonic acid groups, or converting groups convertible to carboxylic acid groups to carboxylic acid groups.

[12] A method for producing an electrolyte membrane, which comprises producing a fluorinated polymer by the production method as defined in any one of the above [1] to [10], forming a membrane by using the fluorinated polymer, and then converting groups convertible to sulfonic acid groups to sulfonic acid groups, or converting groups convertible to carboxylic acid groups to carboxylic acid groups.

[13] A method for producing an electrolyte membrane, which comprises producing a fluorinated polymer having functional groups by the production method as defined in the above [11], and forming a membrane by using the fluorinated polymer having functional groups.

[14] The production method according to the above [12] or [13], wherein the fluorinated polymer having functional groups has an ion exchange capacity of from 0.5 to 2.5 meq/g dry resin.

Advantageous Effects of Invention

According to the present invention, a high molecular weight fluorinated polymer and a fluorinated polymer having functional groups can be stably produced at a high polymerization rate with good productivity, and environmental burdens can be reduced. Further, excellent productivity of an electrolyte membrane is achieved.

DESCRIPTION OF EMBODIMENTS

The following definitions of terms are applicable throughout Description and Claims.

A "unit" generally means an atomic group directly formed by polymerization of one molecule of a monomer and an atomic group obtained by chemical conversion of a part of the atomic group.

An "etheric oxygen atom" means an oxygen atom (—C—O—C—) present singly between carbon atoms.

A "sulfonic acid group" generally means —$SO_3H$ and $SO_3M^1$ (wherein $M^1$ is a monovalent metal ion or an ammonium ion in which at least one hydrogen atom may be substituted by a hydrocarbon group).

A "carboxylic acid group" generally means —COOH and —COO$M^2$ (wherein $M^2$ is a monovalent metal ion or an ammonium ion in which at least one hydrogen atom may be substituted by a hydrocarbon group.

A "precursor group" generally means a group convertible to a sulfonic acid group and a group convertible to a carboxylic acid group.

An "ion exchange group" generally means a sulfonic acid group and a carboxylic acid group.

A "TQ value" is an index to the molecular weight and the softening temperature of a polymer. A higher TQ value means a higher molecular weight. It is a temperature at which an amount of the polymer extruded becomes 100 mm$^3$/sec when the polymer is subjected to melt extrusion using a nozzle having a length of 1 mm and an inner diameter of 1 mm under an extrusion pressure of 2.94 MPa.

In this specification, a monomer represented by the formula (m1) will be referred to as "monomer (m1)". The same applies to monomers represented by other formulae.

Tetrafluoroethylene will be referred to as "TFE".

A hydrofluorocarbon will be referred to as "HFC".

A fluorinated monomer having a precursor group will be referred to as a "monomer (m)".

Units based on a monomer (m) will be referred to as "units (m)". The same applies to units based on other monomers.

An ion exchange capacity will be referred to as "AR".

[Method for Producing Fluorinated Polymer]

The method for producing a fluorinated polymer of the present invention is a method for producing a fluorinated polymer, which comprises polymerizing a monomer mixture containing TFE and a monomer (m) in a polymerization medium, wherein the polymerization medium contains as the main component a $C_{4-10}$ cyclic HFC.

The monomer mixture is a mixture of monomers forming units of a fluorinated polymer by polymerization. The monomer mixture contains as essential components TFE and the monomer (m).

The group convertible to a sulfonic acid group may, for example, be —$SO_2X$ (wherein X is a fluorine atom, a chlorine atom or a bromine atom) or —$SO_2R^1$ (wherein $R^1$ is a perfluoroalkyl group which may have an etheric oxygen atom). Among them, —$SO_2X$ is preferred, and —$SO_2F$ is particularly preferred.

The perfluoroalkyl group as $R^1$ may be linear or branched and is preferably linear. The number of carbon atoms of the perfluoroalkyl group is preferably from 1 to 6, more preferably from 1 to 4. The perfluoroalkyl group is preferably a perfluoromethyl group or a perfluoroethyl group.

In a case where the perfluoroalkyl group as $R^1$ has an etheric oxygen atom, the number of the etheric oxygen atom may be one, or may be two or more. Further, the etheric oxygen atom may be inserted in a carbon atom-carbon atom bond of the perfluoroalkyl group, but is not inserted at the carbon atom bond terminal.

The group convertible to a carboxylic acid group may, for example, be —COOR$^2$ (wherein R$^2$ is a C$_{1-4}$ alkyl group), —CN or —COZ (wherein Z is a halogen atom). Among them, the group convertible to a carboxylic acid group is preferably —COOR$^2$, particularly preferably —COOCH$_3$.

As the monomer (m), only one of the fluorinated monomer having a group convertible to a sulfonic acid group and the fluorinated monomer having a group convertible to a carboxylic acid group may be used, or both may be used. The present invention is more effective in a case where the fluorinated monomer having a group convertible to a sulfonic acid group is used as the monomer (m).

The monomer (m) may, for example, be a monomer (m1) or a monomer (m2). In view of easy production, it is preferred that the monomer (m) contains at least one member selected from the group consisting of the monomer (m1) and the monomer (m2), and it is more preferred that the monomer (m) is at least one member selected from the group consisting of the monomer (m1) and the monomer (m2).

Further, in view of good reactivity at the time of polymerization, the monomer (m) is preferably a vinyl ether, more preferably a perfluorovinyl ether.

As the monomer (m), only one of the monomer (m1) and the monomer (m2) may be used, or both the monomer (m1) and the monomer (m2) may be used.

The monomer (m1) is a monomer represented by the following formula (m1).

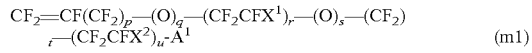

(m1)

In the formula (m1), X$^1$ and X$^2$ are each independently a fluorine atom or a trifluoromethyl group, A$^1$ is a group convertible to a sulfonic acid group or a carboxylic acid group, p is 0 or 1, q is 0 or 1, r is an integer of from 0 to 3, s is 0 or 1, t is an integer of from 0 to 12, u is an integer of from 0 to 3, and 1≤r+u.

A$^1$ is preferably —SO$_2$X or —COOR$^2$, more preferably —SO$_2$F or —COOCH$_3$, particularly preferably —SO$_2$F. q is preferably 1. When both t and u are 0, s is 0. t is preferably an integer of from 1 to 8, more preferably an integer of from 1 to 4.

Specific examples of the monomer (m1) include CF$_2$=CFOCF$_2$CF(CF$_3$)OCF$_2$CF$_2$SO$_2$F, CF$_2$=CFOCF$_2$CF$_2$SO$_2$F, CF$_2$=CFOCF$_2$CF$_2$CF$_2$CF$_2$SO$_2$F, CF$_2$=CFCF$_2$OCF$_2$CF$_2$CF$_2$SO$_2$F and CF$_2$=CFCF$_2$OCF$_2$CF$_2$SO$_2$F.

As specific examples of the monomer (m1), the following may be mentioned.
CF$_2$=CF—O—CF$_2$CF$_2$—COOCH$_3$, CF$_2$=CF—O—CF$_2$CF$_2$—CF$_2$—COOCH$_3$, CF$_2$=CF—O—CF$_2$CF$_2$—CF$_2$CF$_2$—COOCH$_3$, CF$_2$=CF—O—CF$_2$CF$_2$—CF$_2$CF$_2$—CF$_2$—COOCH$_3$, CF$_2$=CF—O—CF$_2$CF$_2$—O—CF$_2$CF$_2$—COOCH$_3$, CF$_2$=CF—O—CF$_2$CF$_2$—O—CF$_2$CF$_2$—CF$_2$—COOCH$_3$, CF$_2$=CF—O—CF$_2$CF$_2$—O—CF$_2$CF$_2$—CF$_2$CF$_2$—COOCH$_3$, CF$_2$=CF—O—CF$_2$—CF$_2$CF$_2$—O—CF$_2$CF$_2$—COOCH$_3$, CF$_2$=CF—O—CF$_2$CF(CF$_3$)—O—CF$_2$CF$_2$—COOCH$_3$, CF$_2$=CF—O—CF$_2$CF(CF$_3$)—O—CF$_2$—CF$_2$CF$_2$—COOCH$_3$.

As the monomer (m1), in view of easy production of the fluorinated polymer and easy industrial application, preferred is CF$_2$=CFOCF$_2$CF(CF$_3$)OCF$_2$CF$_2$SO$_2$F, CF$_2$=CFOCF$_2$CF$_2$SO$_2$F, CF$_2$=CFOCF$_2$CF$_2$CF$_2$CF$_2$SO$_2$F, CF$_2$=CFCF$_2$OCF$_2$CF$_2$SO$_2$F, CF$_2$=CF—O—CF$_2$CF$_2$—COOCH$_3$, CF$_2$=CF—O—CF$_2$CF$_2$—O—CF$_2$CF$_2$—CF$_2$—COOCH$_3$, or CF$_2$=CF—O—CF$_2$CF(CF$_3$)—O—CF$_2$CF$_2$—COOCH$_3$.

The monomer (m1) may be used alone or in combination of two or more.

The monomer (m1) may be produced, for example, by the method disclosed in D. J. Vaugham, "Du Pont Inovation", Vol. 43, No. 3, 1973, p. 10 or the method disclosed in Examples of U.S. Pat. No. 4,358,412.

The monomer (m2) is a monomer represented by the following formula (m2).

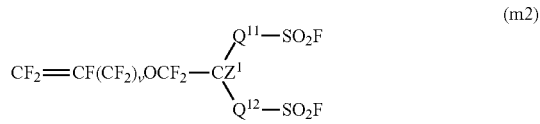

(m2)

In the formula (m2), Q$^{11}$ is a perfluoroalkylene group which may have an etheric oxygen atom, Q$^{12}$ is a single bond or a perfluoroalkylene group which may have an etheric oxygen atom, Z$^1$ is a fluorine atom or a monovalent perfluoroorganic group, and v is 0 or 1. The single bond means a direct bond of the carbon atom of CZ$^1$ and the sulfur atom of SO$_2$F.

In a case where the perfluoroalkylene group as each of Q$^{11}$ and Q$^{12}$ has an etheric oxygen atom, the number of the etheric oxygen atom may be one or may be two or more. The etheric oxygen atom may be inserted in a carbon atom-carbon atom bond of the perfluoroalkylene group or may be inserted at the carbon atom bond terminal, but is not inserted at the terminal directly bonded to the sulfur atom. The perfluoroalkylene group may be linear or branched and is preferably linear.

The number of carbon atoms of the perfluoroalkylene group is preferably from 1 to 6, more preferably from 1 to 4. When the number of carbon atoms is at most 6, the monomer tends to have a low boiling point, whereby purification by distillation will be easy. Further, when the number of carbon atoms is at most 6, a decrease of the ion exchange capacity of the resulting fluorinating polymer is suppressed, and a decrease of the conductivity is suppressed.

Q$^{12}$ is preferably a C$_{1-6}$ perfluoroalkylene group which may have an etheric oxygen atom. In the case of such a group, as compared with a case where Q$^{12}$ is a single bond, a polymer electrolyte fuel cell when operated over a long period of time will be excellent in the stability of the power generation performance.

At least one of Q$^{11}$ and Q$^{12}$ is preferably a C$_{1-6}$ perfluoroalkylene group which may have an etheric oxygen atom. A monomer having such a group can be prepared without fluorination reaction with a fluorine gas, and can easily be produced with good yield.

Z$^1$ is preferably a fluorine atom or a C$_{1-6}$ linear perfluoroalkyl group which may have an etheric oxygen atom, more preferably a fluorine atom.

As the monomer (m2) in view of easy production of the fluorinated polymer and easy industrial application, preferred is a monomer (m2-1), (m2-2) or (m2-3).

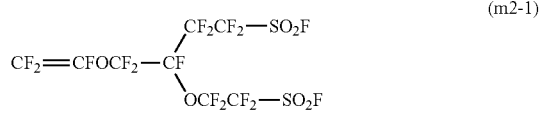

(m2-1)

-continued $$CF_2=CFOCF_2-CF\begin{smallmatrix}CF_2OCF_2CF_2-SO_2F\\ \\OCF_2CF_2-SO_2F\end{smallmatrix} \quad (m2\text{-}2)$$

$$CF_2=CFCF_2OCF_2-CF\begin{smallmatrix}CF_2OCF_2CF_2-SO_2F\\ \\OCF_2CF_2-SO_2F\end{smallmatrix} \quad (m2\text{-}3)$$

The monomer (m2) may be used alone or in combination of two or more. The monomer (m2) may be produced by a known preparation method.

The monomer mixture may contain a monomer other than TFE, the monomer (m1) and the monomer (m2).

Such other monomer may be at least one monomer selected from the following monomer (m3).

$$CF_2=CF-O-R^f \quad (m3)$$

wherein $R^f$ is a $C_{1-12}$ perfluoroalkyl group, a group having an etheric oxygen atom in a carbon-carbon bond of a $C_{2-10}$ perfluoroalkyl group, or a $C_{2-12}$ perfluoroalkenyl group.

As the monomer (m3), for example, the following monomers (m3-1) to (m3-4) may be mentioned.

$$CF_2=CF-O-CF_3 \quad (m3\text{-}1)$$

$$CF_2=CF-O-CF_2CF_2CF_3 \quad (m3\text{-}2)$$

$$CF_2=CF-O-CF_2CF(CF_3)-O-CF_2CF_2CF_3 \quad (m3\text{-}3)$$

$$CF_2=CF-O-CF_2CF_2CF=CF_2 \quad (m3\text{-}4)$$

Further, as other monomer, at least one monomer selected from the following monomers (m4) to (m7) may also be mentioned.

In the formulae, $R^{11}$ is a fluorine atom, a $C_{1-10}$ perfluoroalkyl group or a group having an etheric oxygen atom in a carbon-carbon bond of a $C_{2-10}$ perfluoroalkyl group. $R^{11}$ is preferably a $C_{1-5}$ perfluoroalkyl group, more preferably a trifluoromethyl group. The perfluoroalkyl group may be linear or branched and is preferably linear.

Each of $R^{12}$ and $R^{14}$ is a fluorine atom, a $C_{1-10}$ perfluoroalkyl group or a group having an etheric oxygen atom in a carbon-carbon bond of a $C_{2-10}$ perfluoroalkyl group. $R^{12}$ and $R^{14}$ are each independently preferably a trifluoromethyl group. The perfluoroalkyl group may be linear or branched and is preferably linear.

$R^{13}$ is a single bond, a $C_{1-10}$ perfluoroalkylene group or a group having an etheric oxygen atom in a carbon-carbon bond of a $C_{2-10}$ perfluoroalkylene group. $R^{13}$ is preferably a $C_{2-4}$ perfluoroalkylene group or a group having an etheric oxygen atom in a carbon-carbon bond of a $C_{3-4}$ perfluoroalkylene group. The perfluoroalkylene group may be linear or branched and is preferably linear.

$R^{15}$ is a fluorine atom, a $C_{1-10}$ perfluoroalkyl group or a group having an etheric oxygen atom in a carbon-carbon bond of a $C_{2-10}$ perfluoroalkyl group. $R^{15}$ is preferably a $C_{1-4}$ perfluoroalkyl group or a group having an etheric oxygen atom in a carbon-carbon bond of a $C_{2-4}$ perfluoroalkyl group, more preferably a $C_{1-4}$ perfluoroalkyl group, further preferably a trifluoromethyl group. The perfluoroalkyl group may be linear or branched and is preferably linear.

Q is a single bond, a $C_{1-10}$ perfluoroalkylene group or a group having an etheric oxygen atom in a carbon-carbon bond of a $C_{2-10}$ perfluoroalkylene group.

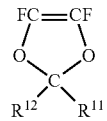
(m4)

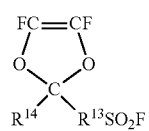
(m5)

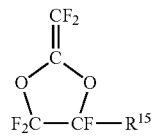
(m6)

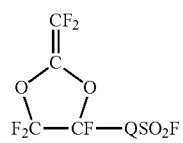
(m7)

As the monomer (m4), for example, the following monomers (m4-1) to (m4-6) may be mentioned.

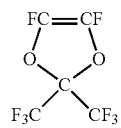
(m4-1)

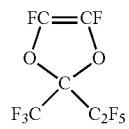
(m4-2)

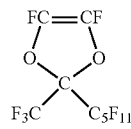
(m4-3)

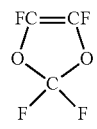
(m4-4)

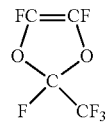
(m4-5)

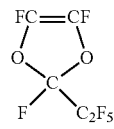
(m4-6)

As the monomer (m5), for example, the following monomer (m5-1) or (m5-2) may be copolymerized.

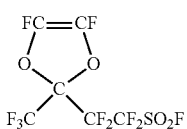

(m5-1)

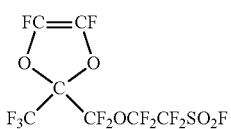

(m5-2)

As the monomer (m6), for example, the following monomer (m6-1) or (m6-2) may be copolymerized.

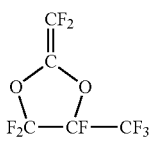

(m6-1)

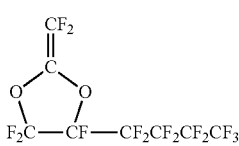

(m6-2)

As the monomer (m7), for example, the following monomer (m7-1) to (m7-3) may be copolymerized.

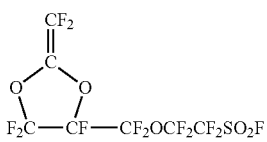

(m7-1)

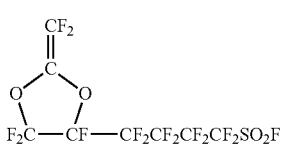

(m7-2)

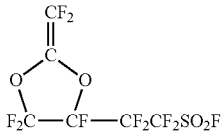

(m7-3)

As other monomer, for example, chlorotrifluoroethylene, vinylidene fluoride, vinyl fluoride, an α-olefin (such as ethylene or propylene), a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene) or a perfluorovinyl ether may be mentioned.

The perfluorovinyl ether may, for example, be a perfluoro (alkyl vinyl ether) or a perfluoro(etheric oxygen atom-containing alkyl vinyl ether).

In the present invention, the proportion of TFE is preferably from 5 to 70 mol %, and the proportion of the monomer (m) is preferably from 30 to 95 mol %, to the total amount of the monomer mixture. In a case where the monomer consists of TFE and the monomer (m), TFE and the monomer (m) are respectively selected within the above ranges so that their total proportion will be 100 mol %.

In a case where the proportion of TFE and the proportion of the monomer (m) are within the above ranges, a fluorinated polymer excellent in mechanical strength and chemical durability and having a high ion exchange capacity is likely to be obtained.

The proportion of TFE to the total amount of the monomer mixture is more preferably from 5 to 65 mol %, further preferably from 5 to 60 mol %, particularly preferably from 5 to 55 mol %. When the proportion of TFE is at least the lower limit value of the above range, the resulting fluorinated polymer is excellent in mechanical strength and chemical durability. When the proportion of TFE is at most the upper limit value of the above range, the content of the monomer (m) in the fluorinated polymer can be made high, whereby the ion exchange capacity of the fluorinated polymer can be made high.

The proportion of the monomer (m) to the total amount of the monomer mixture is particularly preferably from 35 to 95 mol %. When the proportion of the monomer (m) is at least the lower limit value of the above range, a fluorinated polymer having a high ion exchange capacity is likely to be obtained. When the proportion of the monomer (m) is at most the upper limit value of the above range, the content of TFE in the fluorinated polymer can be made high, whereby the fluorinated polymer is excellent in mechanical strength and chemical durability.

In a case where the monomer mixture contains the above other monomer, the proportion of such other monomer to the total amount of the monomer mixture is preferably from 0 to 75 mol %, more preferably from 0 to 70 mol %, further preferably from 0 to 65 mol %, particularly preferably from 0 to 60 mol %. When the proportion of other monomer is within the above range, effects obtained by TFE and the monomer (m) are less likely to be impaired.

A part of monomer may not be dissolved in the polymerization medium and present in a vapor phase part in a reactor, and such a monomer present in the vapor phase part is considered as a part of the monomer mixture.

The polymerization medium contains as the main component a $C_{4-10}$ cyclic HFC. "Containing as the main component a $C_{4-10}$ cyclic HFC" means a proportion of the $C_{4-10}$ cyclic HFC to the total mass of the polymerization medium (not including a monomer such as the monomer (m)) being at least 70 mass %. The proportion of the cyclic HFC is preferably at least 80 mass %, more preferably at least 90 mass %, further preferably at least 95 mass %, most preferably 100 mass % (that is, the polymerization medium consists solely of the cyclic HFC).

The number of carbon atoms of the cyclic HFC is from 4 to 10, preferably from 4 to 8, more preferably from 4 to 6. When the number of carbon atoms of the cyclic HFC is at least the lower limit value of the above range, it is possible to prevent the polymerization medium from having a too low boiling point. When the number of carbon atoms of the cyclic HFC is at most the upper limit value of the above range, it is possible to prevent the polymerization medium from having a too high boiling point.

The cyclic HFC preferably has fluorine atoms in the same number or more as hydrogen atoms. That is, the ratio ($N_F/N_H$) of the number ($N_F$) of fluorine atoms to the number ($N_H$) of hydrogen atoms in the cyclic HFC is preferably at least 1, whereby chemical stability of the cyclic HFC during polymerization is maintained. $N_F/N_H$ is preferably at least 1, more preferably from 1 to 17, particularly preferably from 1 to 11.

As specific examples of the cyclic HFC, 1,1,2,2,3,3,4-heptafluorocyclopentane, 1,1,2,2,3,3-hexafluorocyclopentane, 1H,2H-octafluorocyclopentane, 1,2,3,4,5-pentafluorocyclopentane, 1,1,2,2,3,4,5-heptafluorocyclopentane, 1H-nonafluorocyclopentane, 1,1,2,2,3-pentafluorocyclobutane, 1,1,2,3,3-pentafluorocyclobutane, 1,1,2,2,3,3-hexafluorocyclobutane, 1,1,2,3,3,4-hexafluorocyclobutane, cis-1,1,2,2,3,4-hexafluorocyclobutane, trans-1,1,2,2,3,4-hexafluorocyclobutane, 1,2,3,4,5,6-hexafluorocyclohexane, 1,1,2,3,4,4,5,6-octafluorocyclohexane and 1,1,2,2,3,3,4,4-octafluorocyclohexane may be mentioned. Among them, in view of availability, 1,1,2,2,3,3,4-heptafluorocyclopentane or 1H,2H-octafluorocyclopentane is preferred.

The cyclic HFC may be used alone or in combination of two or more.

The polymerization medium may contain a polymerization medium other than the $C_{4-10}$ cyclic HFC. Other polymerization medium may, for example, be a chain HFC.

The chain HFC may, for example, be $C_2F_5C_2H_5$, $CHF_2CF_2CF_2CHF_2$, $CH_3CF_2CFHCF_3$, $CF_3CH_2CF_2CH_3$, $CF_3CFHCFHCF_2CF_3$, $(CF_3)_2CFC_2H_5$, $CH_3CHFC_2F_5C_2H_5$, $CH_3CF_2CF_2CF_2CF_2H$, $C_4F_9C_2H_5$, $C_2F_5C_2H_4C_2F_5$, $(CF_3)_2CFCHFCHFCF_3$, $CH_3CF_2CF_2CF_2CF_2CF_2H$, $C_6F_{13}H$, $C_6F_{13}C_2H_5$, $C_2H_5C_2F_4C_2H_5$ or $C_8F_{17}C_2H_5$. The chain HFC may be used alone or in combination of two or more.

The proportion of the $C_{4-10}$ cyclic HFC in the polymerization medium is at least 50 mass %, preferably at least 60 mass %, more preferably at least 70 mass %, particularly preferably 100 mass %. The higher the proportion, the higher the polymerization rate, and the higher the molecular weight of the fluorinated polymer.

In the present invention, the monomer mixture is polymerized by polymerization using the polymerization medium containing the cyclic HFC as the main component.

As the polymerization method, known polymerization method such as solution polymerization, suspension polymerization or emulsion polymerization may be employed, and solution polymerization or suspension polymerization is preferred, and solution polymerization is more preferred.

As a radical initiator used for the polymerization, for example, a bis(fluoroacyl) peroxide, a bis(chlorofluoroacyl) peroxide, a dialkyl peroxydicarbonate, a diacyl peroxide, a peroxyester, a dialkyl peroxide, a bis(fluoroalkyl) peroxide, an azo compound or a persulfate may be mentioned.

The molar ratio of the monomer (m) to the polymerization medium in the polymerization is preferably from 0.1 to 100, more preferably from 0.3 to 90, further preferably from 0.5 to 80, particularly preferably from 0.7 to 70. When the molar ratio is at least the lower limit value of the above range, a polymer having a relatively low ion exchange capacity can be prepared at an appropriate reaction rate. When the molar ratio is at most the upper limit value of the above range, such is suitable for polymerization of a monomer mixture to obtain a polymer having a relatively high ion exchange capacity.

The polymerization temperature is preferably from 10 to 150° C., more preferably from 15 to 130° C. The pressure at the time of polymerization is preferably from 0.0 to 2.0 MPaG, more preferably from 0.05 to 1.5 MPaG.

The polymerization time is preferably from 2 to 30 hours, more preferably from 3 to 25 hours.

The TQ value of the fluorinated polymer produced by the present invention is preferably from 150 to 340° C., more preferably from 170 to 300° C. When the TQ value is at least the lower limit value of the above range, when such a fluorinated polymer is formed, the formed product has favorable strength. When the TQ value is at most the upper limit value of the above range, the forming property when the fluorinated polymer is formed will be favorable.

In the fluorinated polymer produced by the present invention, the proportion of the units (TFE) is preferably from 5 to 90 mol %, and the proportion of the units (m) is preferably from 5 to 35 mol %, in all units. In a case where the fluorinated polymer consists of the units (TFE) and the units (m), the proportion of the units (TFE) and the proportion of the units (m) are respectively selected from the above ranges so that their total proportion is 100 mol %.

In a case where the proportion of the units (TFE) and the proportion of the units (m) are within the above ranges, a fluorinated polymer excellent in mechanical strength and chemical durability and having a high ion exchange capacity is likely to be obtained.

The proportion of the units (TFE) to all units in the fluorinated polymer is more preferably from 5 to 85 mol %, further preferably from 6 to 85 mol %, particularly preferably from 7 to 84 mol %. When the proportion of the units (TFE) is at least the lower limit value of the above range, the fluorinated polymer is excellent in mechanical strength and chemical durability. When the proportion of the units (TFE) is at most the upper limit value of the above range, the content of the units (m) in the fluorinated polymer can be made high, whereby the ion exchange capacity of the fluorinated polymer can be made high.

The proportion of the units (m) to all units in the fluorinated polymer is more preferably from 10 to 33 mol %, further preferably from 13 to 31 mol %, particularly preferably from 15 to 31 mol %. When the proportion of the units (m) is at least the lower limit value of the above range, a fluorinated polymer having a high ion exchange capacity is likely to be obtained. When the proportion of the units (m) is at most the upper limit value of the above range, the content of TFE in the fluorinated polymer can be made high, whereby the fluorinated polymer is excellent in mechanical strength and chemical durability.

When the fluorinated polymer contains the above other monomer, the proportion of units based on other monomer to the total amount of the monomer mixture is preferably from 0 to 75 mol %, more preferably from 0 to 74 mol %, further preferably from 0 to 73 mol %, particularly preferably from 0 to 72 mol %. When the proportion of the units based on other monomer is within the above range, the effects obtained by the units (TFE) and the units (m) are less likely to be impaired.

As described above, in the present invention, as the polymerization medium when TFE and the monomer (m) are polymerized, a polymerization medium containing as the main component a $C_{4-10}$ cyclic HFC is used, whereby the polymerization rate of TFE and the monomer (m) is high, thus leading to excellent productivity of the fluorinated polymer, as compared with a case where a chain HFC is used as the polymerization medium. Further, excessive progress of the chain transfer reaction during polymerization is suppressed, whereby a high molecular weight fluorinated polymer can be stably obtained. Further, a $C_{4-10}$ cyclic HFC has a low GWP as compared with a chain HFC, whereby environmental burden can be reduced.

[Method for Producing Fluorinated Polymer Having Functional Groups]

The method for producing a fluorinated polymer having functional groups of the present invention is a method which comprises producing a fluorinated polymer by the method for producing a fluorinated polymer of the present invention, and converting groups convertible to sulfonic acid groups in the fluorinated polymer into sulfonic acid groups, or converting groups convertible to carboxylic acid groups to carboxylic acid groups.

As a method of converting the groups convertible to sulfonic acid groups in the fluorinated polymer to sulfonic acid groups, a known method may be employed, such as a method disclosed in WO2011/013578. Specifically, for example, as a method of converting —$SO_2F$ groups to acid-form sulfonic acid groups (—$SO_3H$ groups), a method of hydrolyzing the —$SO_2F$ groups in the fluorinated polymer by bringing them into contact with a base to be formed into salt-form sulfonic acid groups, and forming the salt-form sulfonic acid groups into acid-form by bringing them into contact with an acid to be converted to acid-form sulfonic acid groups, may be mentioned.

As a method of converting the groups convertible to carboxylic acid groups in the fluorinated polymer to carboxylic acid groups, the same method as the method of converting the groups convertible to sulfonic acid groups to sulfonic acid groups may be mentioned.

AR of the fluorinated polymer having functional groups produced by the present invention is preferably from 0.5 to 2.5 meq/g dry resin, more preferably from 0.7 to 2.3 meq/g dry resin. When AR is at least the lower limit value of the above range, sufficient ion exchange property of the fluorinated polymer can be secured. When AR is at most the upper limit value of the above range, the molecular weight of the fluorinated polymer can be made high, and when such a fluorinated polymer is formed into a formed product such as a membrane, the formed product has sufficient strength.

[Method for Producing Electrolyte Membrane]

The method for producing an electrolyte membrane of the present invention is roughly classified into two types of the following method (x-1) and method (x-2).

(x-1) A method of forming a membrane by using the fluorinated polymer produced by the present invention and converting precursor groups to ion exchange groups.

(x-2) A method of forming a membrane by using a fluorinated polymer having functional groups produced by the present invention.

Method (x-1):

As a method of forming the fluorinated polymer into a membrane, in view of excellent melt flowability of the fluorinated polymer, preferred is extrusion, pressing or orientation.

As a method of converting precursor groups in the fluorinated polymer to ion exchange groups after formation of the membrane, the method described in the method for producing a fluorinated polymer having functional groups may be employed.

After converting the precursor groups to ion exchange groups, so as to stabilize the electrolyte membrane, heat treatment is preferably carried out. The heat treatment temperature is preferably from 130 to 220° C., although it depends on the type of the fluorinated polymer. When the heat treatment temperature is at least 130° C., the fluorinated polymer will not excessively be hydrated. When the heat treatment temperature is at most 220° C., heat decomposition of ion exchange groups is suppressed, and a decrease of the proton conductivity of the electrolyte membrane is suppressed.

Method (x-2):

As a method of forming the fluorinated polymer having functional groups into a membrane, preferred is a method (cast method) of applying a liquid composition of the fluorinated polymer having functional groups to a substrate, followed by drying. The liquid composition is a dispersion having the fluorinated polymer having functional groups dispersed in a dispersion medium containing an organic solvent having a hydroxy group and water.

The organic solvent having a hydroxy group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol. The organic solvent having a hydroxy group may be used alone or in combination of two or more.

After formation of the membrane, in the same manner as the method (x-1), heat treatment is preferably carried out to stabilize the electrolyte membrane.

The electrolyte membrane obtained by the production method of the present invention is suitably used as an ion exchange membrane used for electrolysis of sodium chloride or a membrane/electrode assembly of a polymer electrolyte fuel cell.

EXAMPLES

Now, the present invention will be described in further detail with reference to Examples. However, it should be understood that the present invention is by no means restricted thereto. Ex. 1 is an Example of the present invention, and Ex. 2 and 3 are Comparative Examples.

(Polymerization Reactivity)

In production of a fluorinated polymer in each Ex., the polymerization rate Rp (g/h·L) was calculated from the following formula to evaluate polymerization reactivity. A higher Rp value means more favorable polymerization reactivity.

$$Rp = W1/(T1 \times V1)$$

wherein W1 is the yield (g) of the fluorinated polymer, T1 is the polymerization time (h), and V1 is the total volume (L) of the monomers and the polymerization medium used for polymerization.

(AR)

In a polycarbonate container, 0.7 g of the fluorinated polymer having functional groups and 10 mL of a 0.35 N sodium hydroxide aqueous solution were added, and left at rest at 60° C. for 40 hours to completely convert sulfonic acid groups in the fluorinated polymer having functional groups to Na-form. The solution was subjected to back titillation with a 0.1 N hydrochloric acid to obtain the amount of sodium hydroxide in the solution, thereby to calculate AR (meq/g dry resin) of the fluorinated polymer.

(TQ Value)

The amount of the fluorinated polymer extruded was measured at various temperatures using Flow Tester CFT-500A (manufactured by Shimadzu Corporation), and the TQ value at which the amount extruded became 100 mm³/sec was obtained.

(Abbreviations)

TFE: Tetrafluoroethylene ($CF_2=CF_2$)
PSVE: $CF_2=CFOCF_2CF(CF_3)OCF_2CF_2SO_2F$
HFC-c-447ef: 1,1,2,2,3,3,4-heptafluorocyclopentane (ZEORORA H, trade name Zeon Corporation, GWP: 250)
AC2000: $C_6F_{13}H$ (ASAHIKLIN (registered trademark by Asahi Glass Company, Limited) AC-2000 GWP: 2000)

AE3000: $CF_3CH_2OCF_2CF_2H$ (ASAHIKLIN (registered trademark by Asahi Glass Company, Limited) AE-3000)
AIBN: 2,2'-azobis(isobutylonitrile)

Ex. 1

Into a stainless steel autoclave having an internal capacity of 230 mL, 131.71 g of PSVE, 36. and 14 g of HFC-c-447ef as a polymerization medium and 22.2 mg of AIBN were charged, and under cooling with liquid nitrogen, the interior in the autoclave was sufficiently deaerated. After the temperature was raised to 75° C., TFE was introduced to adjust the pressure to be 1.305 MPaG. TFE was continuously supplied while the temperature and the pressure were kept constant. 4 hours after initiation of polymerization, the autoclave was cooled to terminate the polymerization reaction. The amount of TFE continuously introduced was 10.60 g.

The reaction liquid drawn from the autoclave was diluted with 100 g of AC2000, and 400 g of AE3000 was added to agglomerate the resulting fluorinated polymer, followed by filtration. An operation of adding 250 g of AE3000 to the fluorinated polymer, followed by stirring, washing and filtration, was conducted twice, and then vacuum drying at 80° C. for 16 hours was conducted to obtain 22.94 g of a fluorinated polymer.

Ex. 2, 3

A fluorinated polymer was obtained in the same manner as in Example 1 except that the amounts of the monomers used, the type and the amount used of the polymerization medium, the amount of the catalyst used, and the polymerization reaction conditions were changed as identified in Table 1.

The yield of the fluorinated polymer obtained, the polymerization rate calculated from the yield and the reaction time, AR and TQ in each Ex. are shown in Table 1.

As shown in Table 1, in Ex. 1 in which a $C_{4-10}$ cyclic HFC was used as a polymerization medium, a fluorinated polymer having a high TQ and a sufficient molecular weight was obtained and further, the polymerization rate was high.

On the other hand, in Ex. 2 in which $C_8F_{17}C_2H_5$ which is a chain HFC was used, the polymerization rate was low as compared with Ex. 1, and further, the TQ value was low and the molecular weight of the fluorinated polymer was low. Further, in Ex. 3 in which AC2000 which is a chain HFC was used, the polymerization rate was low as compared with Ex. 1.

This application is a continuation of PCT Application No. PCT/JP2018/023664, filed on Jun. 21, 2018, which is based upon and claims the benefit of priority from Japanese Patent Application No. 2017-121534 filed on Jun. 21, 2017 and Japanese Patent Application No. 2017-201067 filed on Oct. 17, 2017. The contents of those applications are incorporated herein by reference in their entireties.

What is claimed is:

1. A method for producing a fluorinated polymer, which comprises polymerizing a monomer mixture containing tetrafluoroethylene and a fluorinated monomer having a group convertible to a sulfonic acid group or a carboxylic acid group in a polymerization medium, wherein the polymerization medium contains as the main component a $C_{4-10}$ cyclic hydrofluorocarbon,
wherein the content of the cyclic hydrofluorocarbon is at least 50 mass % in the entire polymerization medium.

2. The method for producing a fluorinated polymer according to claim 1, wherein the fluorinated monomer is a vinyl ether having a group convertible to a sulfonic acid group or a carboxylic acid group.

3. The method for producing a fluorinated polymer according to claim 1, wherein the proportion of tetrafluoroethylene is from 5 to 70 mol %, and the proportion of the fluorinated monomer is from 30 to 95 mol % to the total amount of the monomer mixture.

4. The method for producing a fluorinated polymer according to claim 1, wherein the fluorinated polymer has a TQ value of from 150 to 340° C.

5. The method for producing a fluorinated polymer according to claim 1, wherein the fluorinated monomer contains at least one member selected from the group

TABLE 1

| | Monomer | | Polymerization medium | | Catalyst | | Polymerization reaction conditions | | |
|---|---|---|---|---|---|---|---|---|---|
| | TFE [g]* | PSVE [g] | Type | Amount used [g] | Monomer/polymerization medium [mol/mol] | Type | Amount used [mg] | Temperature [° C.] | Pressure [MPaG] | Polymerization time [h] |
| Ex. 1 | 10.60 | 131.71 | HFC-c-447ef | 36.14 | 1.60 | AIBN | 22.20 | 75 | 1.305 | 4.0 |
| Ex. 2 | 9.78 | 92.00 | $C_8F_{17}C_2H_5$ | 68.00 | 1.36 | AIBN | 79.04 | 70 | 1.040 | 7.9 |
| Ex. 3 | 10.20 | 114.98 | AC2000 | 51.45 | 1.60 | AIBN | 21.50 | 75 | 1.160 | 6.0 |

| | Rp [g/h · L] | Yield [g] | AR [meq/g dry resin] | TQ [° C.] |
|---|---|---|---|---|
| Ex. 1 | 57.9 | 22.94 | 1.099 | 221 |
| Ex. 2 | 23.9 | 18.24 | 1.068 | 182 |
| Ex. 3 | 32.2 | 18.78 | 1.090 | 222 |

*TFE: total amount of TFE supplied to the autoclave during polymerization consisting of a monomer represented by the following formula (m1) and a monomer represented by the following formula (m2):

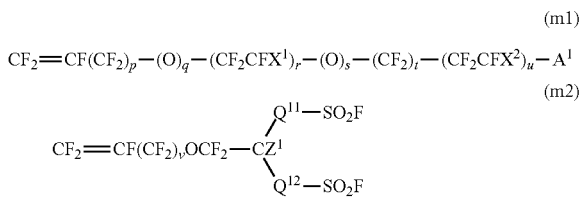

wherein $X^1$ and $X^2$ are each independently a fluorine atom or a trifluoromethyl group, $A^1$ is a group convertible to a sulfonic acid group or a carboxylic acid group, p is 0 or 1, q is 0 or 1, r is an integer of from 0 to 3, s is 0 or 1, t is an integer of from 0 to 12, u is an integer of from 0 to 3, and $1 \le r+u$; and $Q^{11}$ is a perfluoroalkylene group which may have an etheric oxygen atom, $Q^{12}$ is a single bond or a perfluoroalkylene group which may have an etheric oxygen atom, $Z^1$ is a fluorine atom or a monovalent perfluoroorganic group, and v is 0 or 1.

6. The method for producing a fluorinated polymer according to claim 1, wherein the fluorinated monomer is $CF_2=CFOCF_2CF(CF_3)OCF_2CF_2SO_2F$, $CF_2=CFOCF_2CF_2SO_2F$, $CF_2=CFOCF_2CF_2CF_2CF_2SO_2F$ or $CF_2=CFCF_2OCF_2CF_2CFSO_2F$.

7. The method for producing a fluorinated polymer according to claim 1, wherein the fluorinated monomer is the following monomer (m2-1), (m2-2) or (m2-3):

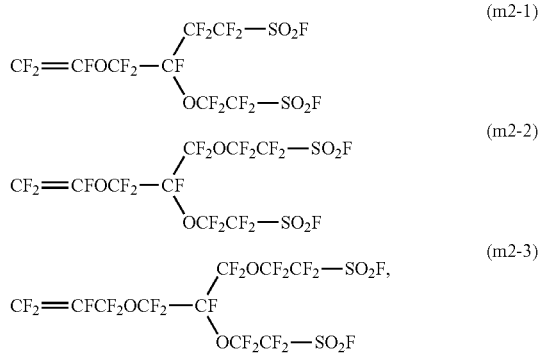

8. The method for producing a fluorinated polymer according to claim 1, wherein the cyclic hydrofluorocarbon has fluorine atoms in the same number or more as hydrogen atoms.

9. The method for producing a fluorinated polymer according to claim 1, wherein the cyclic hydrofluorocarbon is 1,1,2,2,3,3,4-heptafluorocyclopentane or 1H,2H-octafluorocyclopentane.

10. A method for producing a fluorinated polymer having functional groups, which comprises producing a fluorinated polymer by the method for producing a fluorinated polymer as defined in claim 1, and converting groups convertible to sulfonic acid groups in the fluorinated polymer to sulfonic acid groups, or converting groups convertible to carboxylic acid groups to carboxylic acid groups.

11. A method for producing an electrolyte membrane, which comprises producing a fluorinated polymer by the method for producing a fluorinated polymer as defined in claim 1, forming a membrane by using the fluorinated polymer, and then converting groups convertible to sulfonic acid groups to sulfonic acid groups, or converting groups convertible to carboxylic acid groups to carboxylic acid groups.

12. A method for producing an electrolyte membrane, which comprises producing a fluorinated polymer having functional groups by the method for producing a fluorinated polymer having functional groups as defined in claim 10, and forming a membrane by using the fluorinated polymer having functional groups.

13. The method for producing an electrolyte membrane according to claim 12, wherein the fluorinated polymer having functional groups has an ion exchange capacity of from 0.5 to 2.5 meq/g dry resin.

14. A method for producing a fluorinated polymer, which comprises polymerizing a monomer mixture containing tetrafluoroethylene and a fluorinated monomer having a group convertible to a sulfonic acid group or a carboxylic acid group in a polymerization medium, wherein the polymerization medium contains as the main component a $C_{4-10}$ cyclic hydrofluorocarbon, wherein the proportion of tetrafluoroethylene is from 5 to 70 mol %, and the proportion of the fluorinated monomer is from 30 to 95 mol % to the total amount of the monomer mixture.

* * * * *